(No Model.) 2 Sheets—Sheet 1.
R. LAVERY.
TROLLEY FOR HOISTING APPARATUS.
No. 435,502. Patented Sept. 2, 1890.
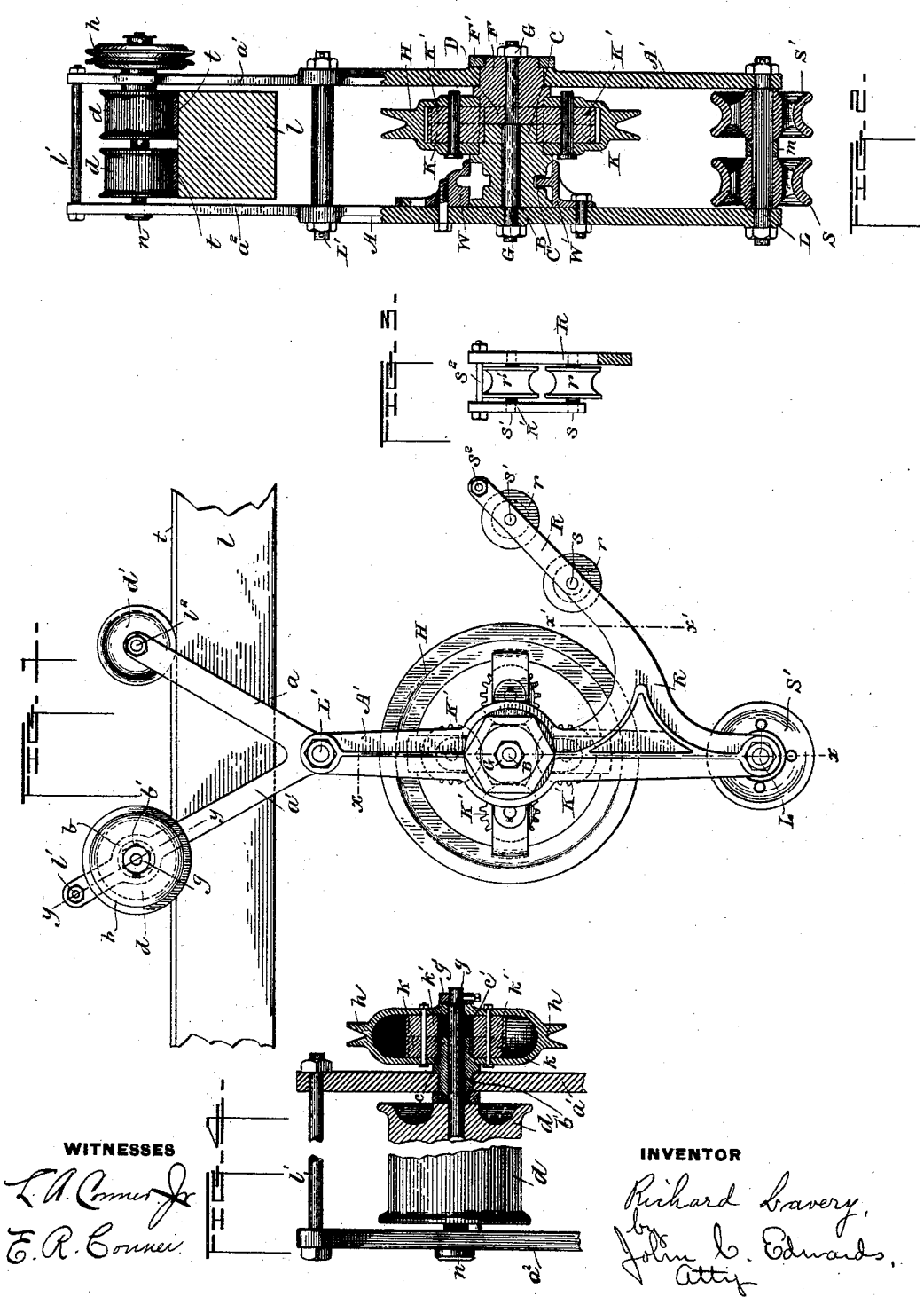

(No Model.) 2 Sheets—Sheet 2.
R. LAVERY.
TROLLEY FOR HOISTING APPARATUS.
No. 435,502. Patented Sept. 2, 1890.
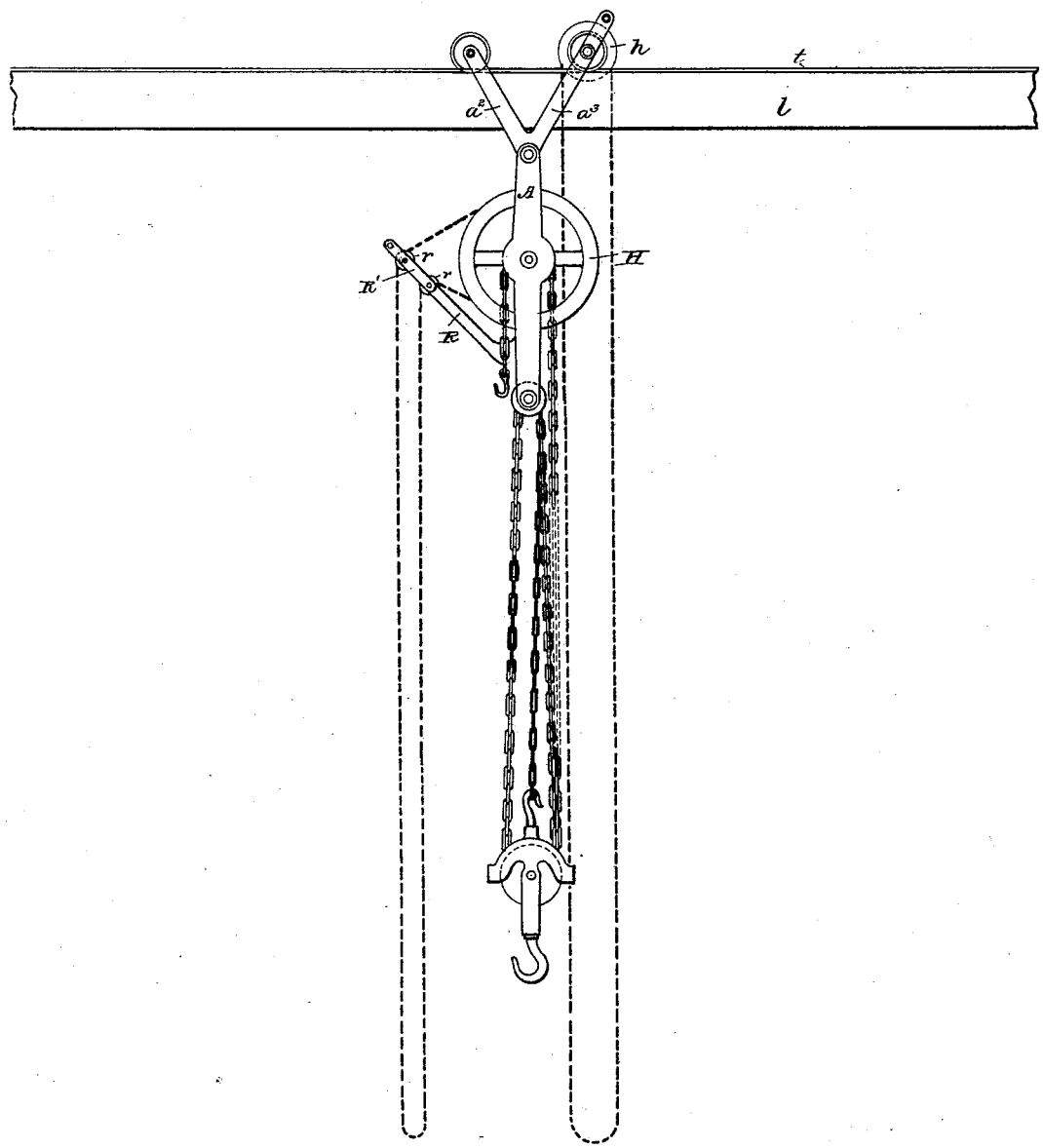
WITNESSES
INVENTOR
Richard Lavery,
by John C. Edwards,
Atty.

UNITED STATES PATENT OFFICE.

RICHARD LAVERY, OF BOSTON, MASSACHUSETTS.

TROLLEY FOR HOISTING APPARATUS.

SPECIFICATION forming part of Letters Patent No. 435,502, dated September 2, 1890.

Application filed January 3, 1890. Serial No. 336,811. (No model.)

*To all whom it may concern:*

Be it known that I, RICHARD LAVERY, of Boston, county of Suffolk, State of Massachusetts, have invented an Improvement in Trolleys for Hoisting Apparatus, of which the following description, in connection with the accompanying drawings, is a specification, like letters on the drawings representing like parts.

This invention has for its object the production of a novel trolley for use on the jibs of cranes or other apparatus for hoisting and conveying loads from one point to another.

In accordance therewith my invention consists, essentially, in the combination, in a trolley for hoisting apparatus, of the side frames, differential gearing and an operating-wheel carried thereby, with a guide for the operating-chain, said guide being composed of an arm offset from one of said side frames and forming a rigid part thereof, studs on said arm, a cover-plate attached to the other ends of said studs, and sheaves rotatable thereon between said arm and cover-plate, substantially as will be described.

My invention also consists in the combination, in a trolley for hoisting apparatus, of the bifurcated side frames, bolts and rods connecting them, and hoisting mechanism carried upon one of said rods, with wheels upon which the trolley is suspended, mechanism for rotating one of said wheels, and sheaves free to rotate upon the lowermost of said bolts and adapted to receive thereover the load-chain, whereby the power may be increased, substantially as will be described.

Other features of my invention will be hereinafter described, and pointed out in the claims.

Figure 1 is a side elevation of a trolley embodying my invention; Fig. 2, an end elevation of the trolley, a portion being in section in the line $x\ x$, Fig. 1. Fig. 3 is an end view of the guide, taken to the right of the line $x'\ x'$, Fig. 1. Fig. 4 is an enlarged view, partly broken out and partly in section on the line $y\ y$, Fig. 1, of the mechanism for moving the trolley from one point to another; and Fig. 5 is a side elevation of the trolley, seen from the side opposite that shown in Fig. 1, the disposition of the several operating chains or ropes being clearly shown.

The greater portion of the side frames A A', rod B, bolt L, central gears C D, operating-wheel H, carrying thereon the differential gears K K', lifting-sheave C', hood W, and block-piece W' may be and are as in Patent No. 402,601, granted to me May 7, 1889, and to which reference may be had, like letters indicating the same parts.

The side frame A' (best shown in Fig. 1) is bifurcated at its upper end, as shown at $a$ $a'$, the longer branch $a'$ having an enlarged portion $b$, (shown in dotted lines, Fig. 1,) provided with a polygonal opening, herein shown as hexagonal, to receive therein the hexagonal shank $b'$ (also shown in dotted lines, Fig. 1) of a gear $c$. A rod $g$ passes loosely through said gear, and has keyed thereon the flanged wheel or wheels $d$, Figs. 2 and 4, adapted to move on the track $t$, attached to the top of the jib or other support $l$. One end of the rod $g$ passes through the branch $a^2$ of the side frame A, to be described hereinafter, and is secured therein by a collar $n$, the opposite end of the rod being extended beyond the gear $c$ and having keyed or otherwise secured thereto a gear $c'$. An operating-wheel $h$, carrying differential gears $k\ k'$, rests on and rotates upon a portion of the gear $c$ and rod $g$, as shown best in Fig. 4, and is retained in place by a nut $g'$ on the end of the rod. Each differential gear consists, essentially, of a gear having a series of teeth $k$ at one end and at its opposite end a series of teeth $k'$, the two series of teeth differing in number. The teeth of the gears $c\ c'$ are equal in number, the said gears being substantially end to end, as shown. As has been described, the gear $c$ is held rigidly in the branch $a'$ by its polygonal shank $b'$, and the gear $c'$ is keyed or otherwise secured to the rod $g$ to rotate therewith. The periphery of the operating-wheel $h$ is toothed or grooved in usual manner for the engagement of a chain or rope, as desired.

I have shown herein a series of four differential gears; but in practice the number of such gears will depend upon the character of the work to be performed and the load to be carried. When rotary motion is imparted to the wheel $h$, the differential gears $k\ k'$ carried thereby are made to roll upon and their opposite ends engage, respectively, the fixed and movable gears $c\ c'$. As the gear $c$ is fixed and engaged by a series of teeth differing in number from the series of teeth engaging the movable gear $c'$, a slow movement of rotation is obtained for the latter gear, which motion is transmitted to the rod $g$, to which it is secured, and by it in turn to the wheel $d$. A bolt $l'$ rigidly connects the upper ends of the branches $a'\ a^2$. Rotation of the wheel $h$ by a suitable operating chain or rope causes the rod $g$ and its attached wheel $d$ to rotate, moving the trolley upon the track of the jib or support in the desired direction.

The upper end of the side frame A is bifurcated in a manner similar to the frame A', and a bolt $l^2$, passed through the branches $a\ a^3$, serves to rigidly connect them, and also forms a shaft upon which the flanged wheel $d'$ rotates, the wheels $d\ d'$ being so disposed with relation to the hoisting mechanism proper carried by the frames A A' that the load is distributed equally upon the said wheels.

The side frame A', as best shown in Fig 1, has rigidly attached thereto, or forming an integral part of it, a chain-guide R R', the said guide preventing the operating chain or rope from being removed laterally from the operating-wheel by any side strain. Studs $s\ s'$, projecting from the arm R of the guide, carry loosely thereon sheaves $r\ r'$, a cover-plate R', Fig. 3, being attached to the other ends of the studs. A bolt $s^2$ connects the upper ends of the arm R and plate R', and also serves as a hood to keep the chain or rope seated in the groove of the sheaves $r'$. The arm R is offset some distance from the wheel H, in order that the operating chain or rope may be at one side of or far enough away from the load to be easily accessible to the operator and insure absolute safety to the operator should any part of the apparatus give way or the load fall. The chain for operating the wheel $h$ falls on the opposite side of the wheel H, and is also readily accessible. The bolt L, connecting the lower ends of the frames A A', is reduced at its ends to form shoulders which abut against the inner side of the said frames, keeping them the proper distance apart, suitable nuts holding the parts firmly in position. Sheaves S S' are free to rotate on the bolt, the sheaves being separated by a collar $m$, held fast on the bolt by a set-screw, (not shown,) the outer ends of the hubs of the sheaves bearing against the inner sides of the frames A A'.

I have herein shown two sheaves upon the bolt; but it is evident that I may employ only one; or by using two or more collars I may increase the number of such sheaves as desired, the object of using such sheaves being to increase the power by passing the load-chain thereover in connection with a tackle-block of usual construction, as shown in Fig. 5.

The strength and rigidity of the trolley may be increased by the employment of a bolt L' just below the point where the bifurcation of the side frame begins, reduced at its ends to leave shoulders, as shown in Fig. 2.

I claim—

1. In a trolley for hoisting apparatus, the side frames, differential gearing, and an operating-wheel carried thereby, combined with a guide for the operating-chain, said guide being composed of the arm R, offset from one of said side frames and forming a rigid part thereof, studs $s\ s'$ on said arm, a cover-plate attached to the other ends of said studs, and sheaves rotatable thereon between said arm and cover-plate, substantially as described.

2. In a trolley for hoisting apparatus, the side frames A A', bifurcated at their upper ends, and hoisting mechanism carried by the frames, combined with the rotatable rod $g$ and bolt $l^2$, connecting the branches of said bifurcations, and wheels $d\ d'$, carried by said rod and bolt, respectively, and adapted to move on the track of a jib or other support, the wheel $d$ being fast upon the rod $g$, and mechanism, substantially as described, for rotating the said rod and wheel, whereby the trolley may be moved from place to place, substantially as described.

3. In a trolley for hoisting apparatus, the bifurcated side frames A A', bolts L L' $l'\ l^2$, and rods $B^3$ connecting them, and hoisting mechanism carried upon the rod B, combined with wheels $d\ d'$, upon which the trolley is suspended, the wheel $d$ being fast upon the rod $g$, mechanism, substantially as described, for rotating the same, and sheaves free to rotate upon the bolt L and adapted to receive thereon the load-chain, whereby the power may be increased, substantially as described.

4. In a trolley for hoisting apparatus, the bifurcated side frames A A', the latter bifurcated at $a\ a'$, and the branch $a'$ having an enlargement $b$, adapted to receive the shank $b'$ of a gear $c$, a rod $g$, extended through the branches $a^2\ a'$ of the frames A A', respectively, a wheel $d$, and differential gearing carried by said rod for moving the trolley, combined with hoisting mechanism carried by the side frames and an offset guide R, rigidly attached to the side of the frame A' opposite the wheel $d$, whereby the operating ropes or chains for the two sets of mechanism for moving and hoisting, respectively, are arranged on opposite sides and away from the load, substantially as described.

In testimony whereof I have signed my name to this specification in the presence of two subscribing witnesses.

RICHARD LAVERY.

Witnesses:
S. JOSEPHINE LAVERY,
SOPHIE J. LAVERY.